United States Patent [19]

Kumm

[11] Patent Number: 4,810,236

[45] Date of Patent: Mar. 7, 1989

[54] FLAT BELT CONTINUOUSLY VARIABLE TRANSMISSION WITH IDLER PULLEY TORQUE TRANSFER INCREASING COMPONENT

[75] Inventor: Emerson L. Kumm, Tempe, Ariz.

[73] Assignee: Kumm Industries, Inc., Phoenix, Ariz.

[21] Appl. No.: 200,587

[22] Filed: May 31, 1988

[51] Int. Cl.⁴ .......................... F16H 7/12; F16H 55/54
[52] U.S. Cl. ...................................... 474/101; 474/49; 474/111; 474/136
[58] Field of Search ....................... 474/49, 50, 52–56, 474/101, 109, 111, 136, 135, 133

[56] References Cited

U.S. PATENT DOCUMENTS

| | | | |
|---|---|---|---|
| 1,370,749 | 3/1921 | Kimble | 474/136 X |
| 3,422,692 | 1/1969 | Woodring | 474/136 |
| 4,295,836 | 10/1981 | Kumm | 474/51 |
| 4,591,351 | 5/1986 | Kumm | 474/49 |
| 4,607,714 | 8/1986 | Uttenthaler | 474/136 |
| 4,714,452 | 12/1987 | Kumm et al. | 474/49 |

Primary Examiner—Thuy M. Bui
Attorney, Agent, or Firm—Charles E. Cates; James H. Phillips

[57] ABSTRACT

A flat belt CVT is disclosed in which an idler pulley is situated intermediate variable diameter driving and driven pulley assemblies and within the axial dimension given by their respective inner guideway discs. the frame supporting the idler pulley is linearly moved on a rail by the slack side belt forces to automatically position the idler pulley in an intermediate position between the belt drive elements of the driving and driven pulley assemblies in accordance with their instantaneous effective diameters. While many arrangements are possible (positioning of the idler may be accomplished on or from either side of the center line between the two pulley assemblies, etc.), a preferred disposition is disclosed in which the idler pulley is situated in a region external to the slack belt side in order that the support apparatus for the idler need not enclose moving belts.

6 Claims, 2 Drawing Sheets

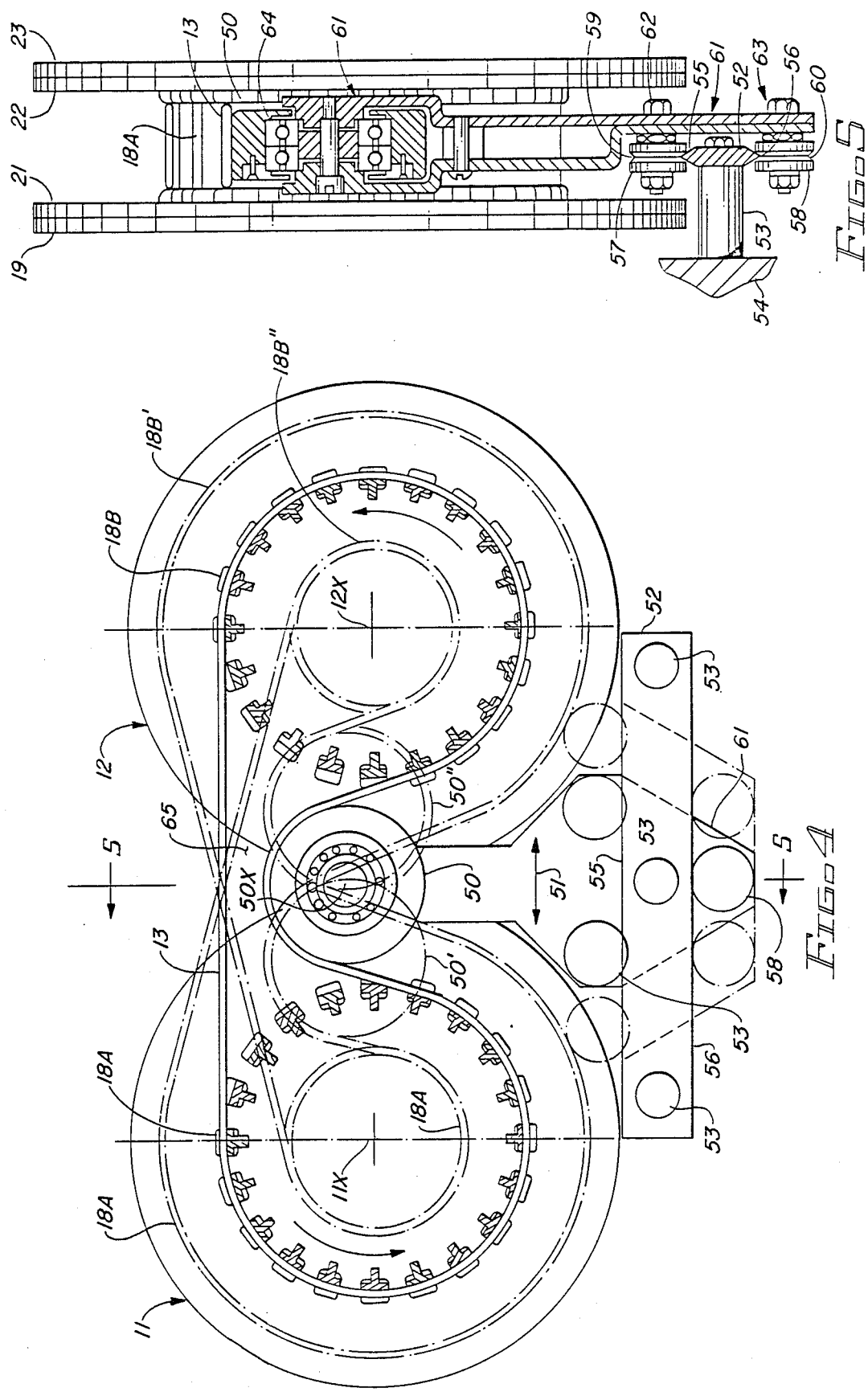

FLAT BELT CONTINUOUSLY VARIABLE TRANSMISSION WITH IDLER PULLEY TORQUE TRANSFER INCREASING COMPONENT

FIELD OF THE INVENTION

This invention relates to the continuously variable transmission (CVT) art and, more particularly, to an arrangement for substantially increasing the torque capability of such a transmission.

BACKGROUND OF THE INVENTION

Continuously variable transmissions of the class broadly characterizable as that in which a belt couples a pair of pulleys, each of which can assume a more or less continuous range of effective diameters, generally fall into two categories; viz.: (a) those employing V-belts or variations thereof (such as link belts or chains) for transmitting power from one pulley to the other and (b) those systems employing flat, flexible belts between the variable diameter pulleys.

Those skilled in the art have come to appreciate that CVT's employing flat, flexible belts enjoy significant fundamental advantages over those systems employing V-belts. In the case of the latter, the belts are composed of various compositions and have a trapezoidal cross section, the belt transmitting rotary motion at one speed from a source of power (such as an engine or motor) to an output shaft at another speed, the speed ratio being varied in a continuous fashion from a minimum to a maximum as dependent on the geometry of the belt and the pulley system. The V-belt is compressed between smooth, conical sheave sections in each of the two pulleys by external axial forces acting on the sections to apply tension or compression to the belt and friction between the sides of the belt in the sheave sections to prevent slippage. In operation, a force unbalance caused by changes in the axial loading of the sheave sections causes the V-belt to change its radial positions in the two pulleys until a force balance is achieved or a limit range stop is reached.

For a large transmitted torque, the required axial forces exerted on the sheaves result in large compressive forces on the V-belt which requires that the belt have a substantial thickness to prevent its axial collapse or failure. This increase in thickness increases the belt's centrifugal force and causes higher belt tension load. In addition, as the belt thickness increases, the pulley size must be increased due to higher stress loads at a given design minimum pulley radius. Further, the typical V-belt must continuously "pull out" from the compressive sheave load on leaving each pulley which results in significant friction losses and belt fatigue which adversely affects the overall efficiency of the system and the operating life of the belt. Consequently, although variable speed pulley drives have successfully used V-belts in a wide range of applications, they have been severely limited in their power capabilities for more competitive smaller size equipment.

As a result of these inherent drawbacks to the use of V-belts in continuously variable transmissions, a second category has developed which may broadly be designated as flat belt drive continuously variable transmissions. As the name suggests, flat belts are employed between driven and driving pulley assemblies which are dynamically individually variable in diameter to obtain the sought-after ratio changes. No axial movement between the two pulley rims is necessary. On the other hand, it is necessary to somehow effect the diametric variations of the individual pulley assemblies, and in one particularly effective system, this function is achieved by causing a circular array of drive elements in each pulley to translate radially inwardly or outwardly in concert as may be appropriate to obtain a given effective diameter of the pulley assembly. Variable speed flat belt transmissions of this particular type, and their associated control systems, are disclosed in U.S. Pat. Nos. 4,024,772; 4,295,836; 4,591,351 and 4,714,452 as well as U.S. patent application Ser. No. 051,922, filed May 19, 1987, and now U.S. Pat. No. 4,768,996 and Ser. No. 132,783, filed Dec. 14, 1987, all issued to Emerson L. Kumm. In all but the first patent enumerated above, the subject variable diameter pulley components have included a pair of pulley sheaves between which there extends a series of belt engaging elements that are simultaneously moved both radially and circumferentially. In one exemplary construction, there is a series of twenty-four belt engaging elements such that an angle of fifteen degrees extends between runs of the belt coming off tangentially from one belt engaging element compared to that of an immediately adjacent belt engaging element.

Each pulley assembly includes two sets of two disks (designated, respectively, the inner guideway disk and the outer guideway disk in each pair) which are parallel to each other with the inner and outer guideway disks of each set being disposed immediately adjacent one another. Each of the guideway disks of an adjacent pair has a series of spiral grooves or guideways with the guideways of the pair oriented in the opposite sense such that the ends of the belt engaging elements are captured at the intersections of the spiral guideways. Thus, radial adjustment of the belt engaging elements may be achieved by bringing about transient relative rotation between the inner and outer guideway disks to change their angular relationship, this operation being, of course, carried out simultaneously and in coordination at both sets of guideway disks of a pulley assembly.

It is well known in the art that a pulley can transmit more torque with reduced belt slippage if an idler is used to increase the belt length contacting the pulley circumference. Such an arrangement brings about an increase in the belt wrap angle which results in increased area of contact between the belt and the pulley surface. However, idlers for this purpose have been positioned such that the belt wrap angle actually decreases on a given pulley as the effective diameter of that pulley decreases. Further, in the flat belt CVT environment, the outside dimensions of the driving and driven pulleys are typically closely spaced to achieve a compact structure. This invention achieves a practical approach which permits a dynamically variably positioned torque increasing idler to be used within the variable geometry and space restrictions of a flat belt CVT.

OBJECTS OF THE INVENTION

It is therefore a broad object of my invention to provide an improved flat belt continuously variable transmission.

It is another object of my invention to provide, in such a continuously variable transmission, higher torque capacity for the minimum pulley diameters at a reasonable slip.

It is a still further object of my invention to provide such a system which is relatively compact, lightweight, simple and inexpensive.

It is yet another object of my invention to increase the operating life of the belt used in the continuously variable transmission.

In another aspect, it is a more specific object of my invention to provide such an arrangement that automatically adjusts for changing pulley radii as the speed ratio of the transmission is varied.

In a still more specific aspect, it is an object of my invention to provide a torque increasing idler disposed between driving and driven pulley assemblies of a continuously variable transmission and supported for limited traverse generally parallel to a plane passing through the axes of the driving and driven pulley assemblies.

SUMMARY OF THE INVENTION

Briefly, these and other objects of my invention are achieved by providing, in a flat belt CVT, an idler pulley within the axial dimension given by the inner guideway discs of variable diameter driving and driven pulley assemblies. The idler pulley is moved by the slack side belt forces to automatically locate in an intermediate position between the belt drive elements of the two pulley assemblies. This result follows from the fact that, with a fixed pulley center distance and a fixed belt length, the distance between the belt drive elements of one pulley assembly to the belt drive elements of the other pulley assembly remains substantially constant as the transmission speed ratio is changed; i e., the belt radius in one pulley assembly is changed relative to its radius in the other pulley assembly. While many arrangements are possible (positioning of the idler may be accomplished at or on either side of the center line between the two pulley assemblies, etc.), a preferred disposition situates the idler within a region external to the slack belt side. Such an arrangement does not require that the support apparatus for the idler enclose the moving belt. In the presently preferred embodiment, the idler pulley is supported on a frame for linear traverse between its extreme positions (according to the instantaneous transfer ratio of the CVT) intermediate the driving and driven pulley assemblies.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is a simplified plan view, part in cross section, of a flat belt CVT illustrating the location and movement of the idler pulley with changing radial positions of the belt in the driven and driving pulley assemblies; and FIG. 5 is a simplified cross sectional view, taken along the line 5—5 of FIG. 4, of the idler pulley, its support structure and roller system in position between the two pulley assemblies.

DETAILED DESCRIPTION OF THE INVENTION

Figure 1:
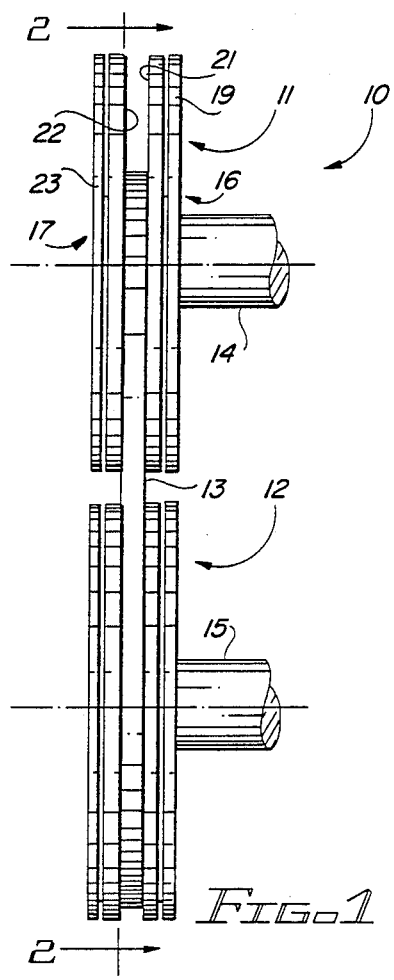
FIG. 1 illustrates an edge on view of driving and driven pulley assemblies coupled by a flat belt and representative of the class of continuously variable transmission in which the present invention finds application.
Figure 2:
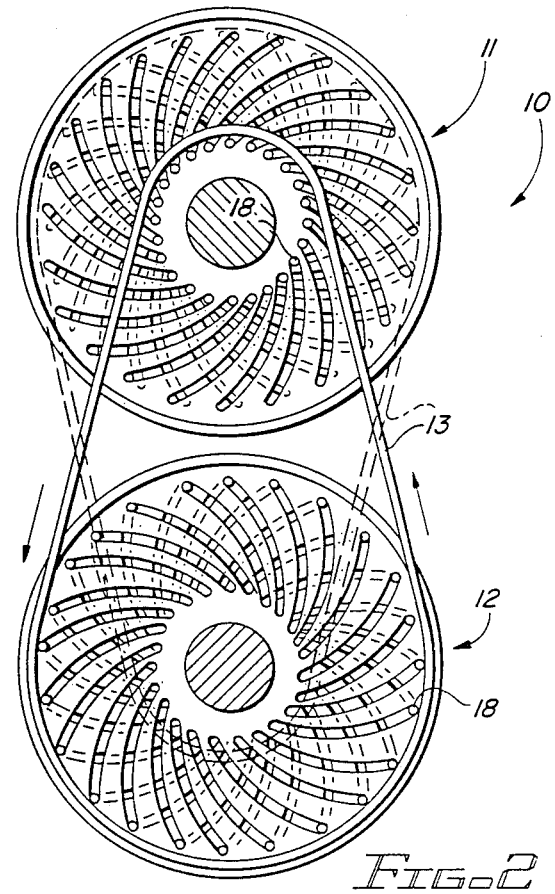
FIG. 2 a cross sectional view, taken along the lines 2—2 of FIG. 1, of the pulley assembly system illustrated in FIG. 1.
Figure 3:
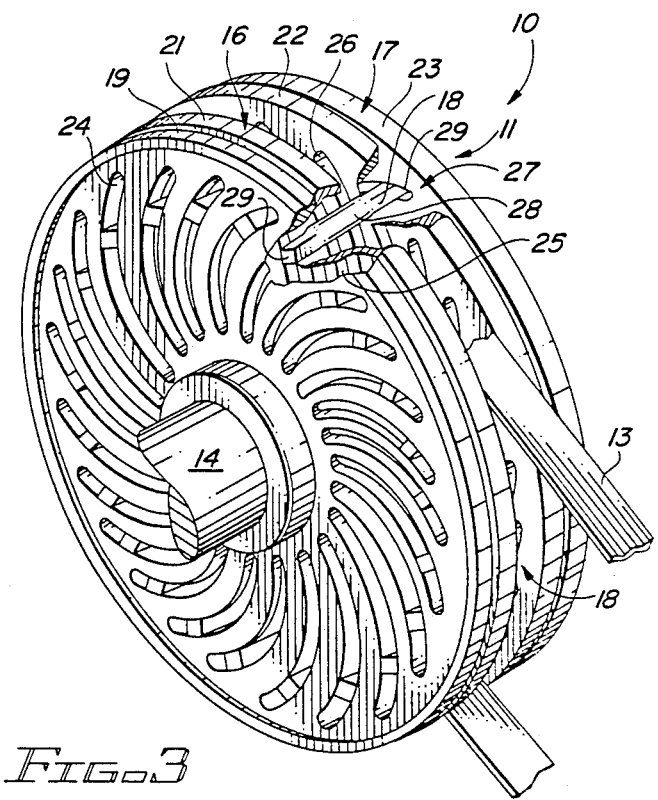
Fig 3 is a fragmentary perspective view, partially broken away, of a pulley assembly particularly illustrating the relationships between inner and outer guideway disk components and belt engaging element components.

Referring now to FIGS. 1, 2 and 3, fundamental aspects of the flat belt type of continuously variable transmission (with which the subject idler pulley system is employed) are illustrated as embodied in a variable diameter pulley drive system 10 including variable diameter pulley assemblies 11 and 12 connected by a flat drive belt 13. The pulley assembly 11 will be considered as the driving pulley assembly and the pulley assembly 12 as the driven pulley assembly in this discussion, but it will be understood that the roles of these pulley assemblies may be reversed without altering the concepts involved.

The pulley assembly 11 is appropriately mounted on a shaft 14, and the pulley assembly 12 is similarly appropriately mounted on a shaft 15 as is well understood in the art. The pulley assemblies 11 and 12 are similar to each other, and only one of them, namely pulley assembly 11, will be specifically described in this discussion. The belt 13 as shown in FIG. 3 corresponds to the position of the belt 13 of FIG. 2 in the dashed line position.

The pulley assembly 11 includes a pair of pulley sheaves 16 and 17 between which there extends a series of belt engaging elements 18, the latter being engaged by the belt 13 for driving, or driven, conditions as will be understood. In one construction, there is a series of twenty-four belt engaging elements 18 equally circumferentially distributed whereby an angle of fifteen degrees is established between runs of the belt 13 coming off tangentially from one belt engaging element 18 as compared to that of an immediately adjacent belt engaging element 18. Each belt engaging element 18 includes a central shank 28, which engages the belt 13, and bearing regions 29 at each end.

The pulley sheave 16 incorporates a pair of pulley guideway disks 19 and 21 which are parallel to and lie immediately adjacent each other in juxtaposition. Similarly the pulley sheave 17 comprises a pair of pulley guideway disks 22 and 23 which are parallel to and lie immediately adjacent each other in juxtaposition. The longitudinal spacing between the pulley sheaves 16 and 17 (i.e., the axial spacing between the inner guideway disks 21 and 22) remains the same irrespective of the radial adjustment of the belt 13 for different driving or driven speeds. This spacing is sufficient to accommodate with clearance the belt drive element which supports the belt 13 which is selected to carry the load that the system is designed for as is well understood.

The range of radial adjustment or position of the belt 13 on the pulley assembly 11, as may be envisioned by the solid line and dashed line positions of belt 13 in FIG. 2, is achieved by altering the radial positions of the belt engaging elements 18. For example, in FIG. 2 the belt engaging elements 18 are close to the center of the shaft 14 in the solid line position of the belt 13 on pulley assembly 11; conversely, the belt engaging elements are radially farther out, namely adjacent the periphery, when the belt 13 is in its dashed line position which is also the position shown in FIG. 3.

Variations in the radial positions of the belt engaging elements 18 is achieved by relative rotation of the outer guideway disk 19 and the inner guideway disk 21 of pulley sheave 16 to change their angular relationship. Similarly, by identical relative rotation of the guideway disks 23, 22, respectively, of pulley sheave 17, change of angular relationship is accomplished. As a practical matter, to insure synchronous operation, the inner guideway disks 21 and 22 are physically locked together, and the outer guideway disks 19 and 23 are also locked together. Power for such operation, not shown in FIGS. 1, 2 or 3, has been achieved in the prior art typically as disclosed in U.S. Pat. No. 4,295,836 previously referenced. Particularly effective systems for controlling the phase angles between the inner and outer guideway disks are disclosed in the above-referenced U.S. patent application Ser. No. 051,922, filed May 19, 1987, and now U.S. Pat. No. 4,768,996 and Ser. No. 132,783, filed Dec. 14, 1987.

The outer guideway disk 19 has a series of logarithmic spiral guideways 24 therein which progress outwardly from adjacent the center at an angle of forty-five degrees with respect to the pulley assembly radius. Similarly the inner guideway disk 21 has a series of logarithmic spiral guideways 25 radiating outwardly at an angle of forty-five degrees with respect to the pulley assembly radius, but in the opposite sense to the guideways 24 of guideway disk 19. Since the guideways 24 and 25 radiate outwardly at angles of forty-five degrees with respect to the pulley radius, but in opposite senses, the intersections of these guideways exist at ninety degrees at all radial positions. This results in a substantially constant geometry at the intersections of the logarithmic spiral guideways 24 and 25 at all radial positions for receiving the bearing region ends 29 of the belt engaging elements 18. Similarly, the inner guideway disk 22 has a series of logarithmic spiral guideways 26 radiating outwardly identically to the guideways 25 of inner guideway disk 21, and the outer guideway disk 23 includes logarithmic spiral guideways 27 extending outwardly identically to the guideways 24 of outer guideway disk 19. Hence, the guideways 26 and 27 intersect at ninety degrees at all radial positions to give a constant intersection geometry identical to the logarithmic spiral guideways 24 and 25 for receiving the other ends of the belt engaging elements 18.

While forty-five degree spirals have been shown and give ninety degree intersections, it will be understood that logarithmic spirals of other angularities may be used as desired. Also, minor variations from a particular angularity may be tolerated so long as the belt engaging element bearing ends supported at the guideway intersections will move appropriately when the sheaves are rotated relative to each other to change the angular relationship between the inner and outer guideway disks.

It will be clear that the belt 13, as it passes around the pulley assembly 11 or 12, engages the central shank portion of the belt engaging elements 18 and causes one pulley assembly to drive and the other pulley assembly to be driven in the obvious fashion.

The foregoing description of the basic drive system, the pulley assemblies 11 and 12, the belt 13 and the belt engaging elements 18 is set forth in greater detail in U.S. Pat. No. 4,295,836, dated Oct. 20, 1981, previously referred to and does not form a specific part of the invention described in this application, but forms the environment in which the invention functions.

While it is possible to have a number of different arrangements to support and move an idler pulley which will increase the belt wrap angle about the pulley assemblies, the presently preferred embodiment employs a construction which is rigidly positioned in the axial dimension (parallel to the pulley shaft axes), but is permitted to move freely on a support rail aligned parallel to the line connecting the centers of the pulley assemblies. The idler pulley must be integrated into the transmission system in such a manner as to prevent its contacting the close fitting inner guideway disks, yet support a roller whose width is adequate for accommodating the belt. This results in a compact design as shown in the drawing and which will be discussed in detail below.

Thus, attention is now directed to FIG. 4 which illustrates a continuously variable transmission which incorporates a torque capacity increasing idler pulley according to the present invention. For reference purposes in FIG. 4, the left pulley assembly will be considered the driving pulley assembly 11 and the right pulley assembly will be considered the driven pulley assembly 12, it having been previously noted that the roles of these pulley assemblies may be reversed without altering the concepts involved. The belt engaging elements of the driving pulley assembly 11 in FIG. 4 are identified by the reference character 18A, and the belt engaging elements of the driven pulley assembly 12 are identified by the reference character 18B.

In a first exemplary position, shown in bold in FIG. 4, the belt engaging elements 18A of the driving pulley assembly 11 and the belt engaging elements 18B of the driven pulley assembly 12 are at about the same radial position, and the belt 13 couples the two pulley assemblies as previously described. It will be observed, however, that the belt 13 wraps the belt engaging elements 18A, 18B of the pulley assemblies 11, 12 more than 180 degrees as a consequence of the provision of an idler pulley 50 situated intermediate the pulley assemblies 11, 12. Those skilled in the art will appreciate that the provision of such an idler pulley will increase the torque transmitting capabilities, for slippage characteristic of normal operation, of the CVT as a straightforward consequence of the belt 13 engaging physically more area of the belt engaging elements 18A, 18B central shank portions 28 resulting in a larger pulley belt wrap angle. The idler pulley 50 does not have a fixed position, but is rather capable of linear traversing movement (indicated by the double ended arrow 51) such that its axis 50X can translate in a line parallel to a line connecting the axes 11X, 12X of the pulley assemblies 11, 12, the idler pulley axis 50X remaining parallel, during such traverse, to the axes 11X, 12X as viewed in FIG. 4.

Consider now the effect on the position of the idler pulley 50 when there is a change in transmission ratio from approximately 1 to 1 to the lower ratio at which the belt driving elements 18A of the driving pulley assembly 11 assume the position shown in phantom as indicated at 18A'. Because of the fixed length of the belt 13, the belt engaging elements 18B of the driven pulley assembly 12 will move radially outwardly to the position indicated at 18B'. The left/right force balance of the horizontal components of the forces applied to the idler pulley 50, must, of course, be maintained and, since the idler pulley is free to translate linearly between the pulley assemblies as previously described, it will seek the position indicated at 50'. This position is much closer to the axis 11X of the driving pulley assembly 11 than to the axis 12X of the driven pulley assembly 12. Thus, the angle of wrap about the belt engaging elements 18A' is increased somewhat and around the belt engaging elements 18B' somewhat decreased to favorably distribute the torque-increasing effect of provided by the idler pulley 50. The smaller pulley, 11, is more vulnerable to belt slip, and this is compensated by substantially increasing the angle of belt wrap on the smaller pulley relative to the belt wrap angle in a conventional CVT drive arrangement, 11, FIG. 2.

Conversely, consider the opposite condition in which belt engaging elements 18A" of the driving pulley assembly 11 have moved to a radially outward limit and the belt engaging elements 18B" have correspondingly moved to their radial innermost positions, again as a consequence of the fixed belt length and fixed distance between the axes 11X, 12X of the pulley assemblies 11, 12. Under this condition, the idler pulley 50 will traverse linearly toward the driven pulley assembly 12 to assume the position indicated at 50" increasing somewhat the angle of wrap about the belt engaging elements 18B" and decreasing somewhat the angle of wrap about the belt engaging elements 18A". Once again, the smaller pulley, 12, is more vulnerable to belt slip, and this is compensated by substantially increasing the belt wrap angle on the smaller pulley relative to the belt wrap angle in a conventional CVT drive arrangement, 12, FIG. 2. It will be apparent that, for all intermediate positions of the belt engaging elements 18A, 18B, the idler pulley 50 will assume a position along its path of linear travel at which the horizontal forces are at a balance point. By this means, the constant length characteristic of the belt 13 is accommodated.

Two practical requirements should be met to permit the use of the idler pulley 50 in a flat belt CVT employing inner and outer guideway disks as previously discussed for both the driving 11 and driven 12 pulley assemblies. In the preferred embodiment, the travel of the pulley 50 is constrained to be linear (however, a non-linear travel variant is discussed below) with its axis disposed between and parallel to the axes 11X, 12X of the pulley assemblies 11, 12 and, to achieve the maximum effect, the idler pulley structure must permit it to operate between the inner guideway disks of each pulley assembly. The presently preferred manner for reaching these objectives is shown in FIGS. 4 and 5. A rail 52 is juxtaposed with respect to the pulley assemblies 11, 12 by supporting it by cantilever members 53 from the transmission housing 54 or other appropriate structure in an orientation generally transverse to the axes of the pulley assemblies. The rail 52 has upper 55 and lower 56 outwardly directed V-shaped bearing surfaces on which upper 57 and lower 58 rollers bear. The outer circumferences of the rollers 57, 58 have respective inverted-V surfaces 59, 60 which are complementary to the upper and lower guide surfaces 55, 56.

An idler pulley frame 61 is affixed to and supported by the rollers 57, 58 as by conventional nut and bolt assemblies 62, 63. The idler pulley frame 61 extends upwardly and, at a position near its top, supports an idler pulley bearing 64 which rotatably carries the idler pulley 50. It will be observed that the maximum width of the idler pulley frame 61 is less than the distance between the two inner guideway disks 21, 22 between which the frame 61 resides with clearance from each of the inner guideway disks. It will also be observed that the width of the idler pulley 50 itself is less than the length of the central shanks 28 of the belt engaging elements 18A (see FIG. 3). These dimension considerations permit the idler pulley 50 to move very close to the belt engaging elements 18A, 18B as may be appropriate for very high or very low torque transmission ratios.

In order to obtain maximum increased wrap (and hence maximum torque transfer) effect, it is desirable for the axis 50X of the idler pulley 50 to be situated above (in the orientation shown in FIGS. 4 and 5) of the axes 11X, 12X of the pulley assemblies 11, 12. The practical limitation on the uppermost limit of this position is one in which safe clearance of the belt 13 from itself is maintained in the region 65 above the idler pulley.

The incorporation of the idler pulley 50 into the flat belt CVT in such a manner as to permit its linear travel between positions proximate the belt engaging elements 18A, 18B of the driven 11 and driving pulley assemblies 12 increases the torque transfer capability for a given slip by on the order of 30%–40% for the minimum pulley assembly effective diameter as compared to a conventional arrangement shown in FIG. 2. This permits a significant reduction in the overall CVT size for a given torque capacity. In addition, the larger wrap angle also reduces the maximum belt tension required for a specific torque. Still further, the overall belt length is increased which obtains an increased belt life.

It may be observed that a somewhat simpler structure may use a lever which is rotatable about a pivot point outside the pulley envelop on a line midway between the pulley assemblies 11, 12. With this arrangement, however, the force balance on the idler pulley is such as to move the idler pulley toward contact with the smaller of the two pulley assemblies. These effects could be overcome with the use of springs and frictional restraints (such as a spring washer on the pivot bolt), but the linear traverse path (oriented generally normal to the axes of the pulley assemblies 11, 12) of the subject idler pulley system is simpler, self adjusting and does not suffer from any of the drawbacks of such a pivoted frame structure. For certain configurations, it may be theoretically preferable to select the path of the idler pulley assembly traverse to be other than linear (such as a circular arc) by providing appropriate curvature to the rail 52. As a practical matter, the linear configuration is easier to fabricate and operates very satisfactorily.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

I claim:
1. A continuously variable transmission comprising:
   (A) first and second pulley assemblies, each said pulley assembly comprising:
      1. a shaft;
      2. a pair of pulley sheaves;
      3. a series of belt engaging elements, each said belt engaging element having:
         a. an elongated central shank including a drive surface adapted to be engaged by said drive belt;

b. a first bearing region at a first end of said central shank; and
c. a second bearing region at a second end of said central shank;
4. each said pulley sheave including:
   a. a pair of relatively movable guideway disks lying alongside each other in juxtaposition;
      i. an inner guideway disk of each said pair including a first series of guideways extending in one direction;
      ii. an outer guideway disk of each said pair including a second series of guideways extending in a second direction;
      iii. said first and second series of spiral guideways providing intersections for capturing and locating said bearing regions of said belt engaging elements, said intersections providing locations for said bearing regions to establish radial positions of said belt engaging elements with respect to said shaft;
5. means connecting said inner guideway disks of said pulley sheaves together to establish an inner guideway disk structure which rotates about said shaft;
6. means connecting said outer guideway disks of said pulley sheaves together to establish an outer guideway disk structure which rotates about said shaft;
7. means coupling at least one of said guideway disks to said shaft for rotation therewith; and
8. means for adjusting the phase relationship between said inner guideway disks and said outer guideway disks to establish the effective diameter of said pulley assembly;

(B) a flat drive belt coupling said first and second pulley assemblies; and
(C) an idler pulley system including:
   1. a rail disposed in fixed juxtaposition with respect to, and oriented generally transverse to, axes of said first and second pulley assemblies;
   2. an idler pulley frame;
   3. means for supporting said idler pulley frame on said rail such that said frame can traverse along the length of said rail;
   4. an idler pulley; and
   5. means for supporting said idler pulley on said frame such that said idler pulley is positioned between, and with its axis parallel to, the axes of said first and second pulley assemblies.

2. The continuously variable transmission of claim 1 in which said rail is straight and orientated normal to the axes of said first and second pulley assemblies such that the traverse path of said idler pulley frame is linear.

3. The continuously variable transmission of claim 2 in which
   (A) said rail has upper and lower bearing surfaces; and
   (B) said frame carries upper and lower rollers having outer circumferential surfaces which bear against said rail bearing surfaces; and
   (C) said rail bearing surfaces and said roller circumferential surfaces are complementary and configured to constrain said frame against movement parallel to the axis of said idler pulley.

4. The continuously variable transmission of claim 3 in which (A) said upper and lower bearing surfaces have outwardly directed V-shaped configurations; and
(B) said upper and lower roller outer surfaces have inverted-V configurations respectively complementary to said upper and lower bearing surfaces.

5. A continuously variable transmission comprising:
(A) first and second pulley assemblies, each said pulley assembly comprising:
   1. a shaft;
   2. a pair of pulley sheaves;
   3. a series of belt engaging elements, each said belt engaging element having:
      a. an elongated central shank including a drive surface adapted to be engaged by said drive belt;
      b. a first bearing region at a first end of said central shank; and
      c. a second bearing region at a second end of said central shank;
   4. each said pulley sheave including:
      a. a pair of relatively movable guideway disks lying alongside each other in juxtaposition;
         i. an inner guideway disk of each said pair including a first series of guideways extending in one direction;
         ii. an outer guideway disk of each said pair including a second series of guideways extending in a second direction;
         iii. said first and second series of spiral guideways providing intersections for capturing and locating said bearing regions of said belt engaging elements, said intersections providing locations for said bearing regions to establish radial positions of said belt engaging elements with respect to said shaft;
   5. means connecting said inner guideway disks of said pulley sheaves together to establish an inner guideway disk structure which rotates about said shaft;
   6. means connecting said outer guideway disks of said pulley sheaves together to establish an outer guideway disk structure which rotates about said shaft;
   7. means coupling at least one of said guideway disks to said shaft for rotation therewith; and
   8. means for adjusting the phase relationship between said inner guideway disks and said outer guideway disks to establish the effective diameter of said pulley assembly;

(B) a flat drive belt coupling said first and second pulley assemblies;
(C) an idler pulley disposed intermediate respective axes of said first and second pulley assemblies such that said flat drive belt passes over said idler pulley to increase the belt wrap angle around each of said first and second pulley assemblies; and
(D) means for moving said idler pulley in a direction with respect to one of said first and second pulley assemblies such that, as the effective diameter of said one pulley assembly decreases, said idler pulley moves in a direction towards said one pulley assembly and, as the effective diameter of said one pulley assembly increases, said idler pulley moves in a direction away from said one pulley assembly.

6. The continuously variable transmission of claim 5 in which the traverse path of said idler pulley is linear.

* * * * *